United States Patent [19]
Tuohy

[11] Patent Number: 5,363,822
[45] Date of Patent: Nov. 15, 1994

[54] ASSEMBLY AND METHOD OF USING A MULTI-PART PISTON WITH A REMOVABLE HEAD

[76] Inventor: Matthew J. Tuohy, P.O. Box 785, Kent, Wash. 98035-0785

[21] Appl. No.: 89,301

[22] Filed: Jul. 9, 1993

[51] Int. Cl.⁵ .............................................. F02F 3/16
[52] U.S. Cl. .................................... 123/193.6; 92/218
[58] Field of Search ............ 123/193.6, 193.4, DIG. 6, 123/DIG. 7, 27 R; 92/216, 217, 218

[56] References Cited

U.S. PATENT DOCUMENTS

| | | | |
|---|---|---|---|
| 1,347,819 | 7/1920 | Mooers | 92/217 |
| 1,723,187 | 8/1929 | Lemieux | 92/218 |
| 1,900,991 | 3/1933 | Matheson | 92/217 |
| 2,174,417 | 9/1939 | Hallstead | 92/218 |
| 4,520,765 | 6/1985 | Gerace | 123/27 R |
| 4,635,596 | 1/1987 | Nakano et al. | 123/193.6 |
| 4,747,340 | 5/1988 | Schellmann et al. | 92/222 |
| 5,179,916 | 1/1993 | Schonfeld | 123/193.6 |

FOREIGN PATENT DOCUMENTS

153451  8/1985  Japan ............................ 123/193.6

Primary Examiner—David A. Okonsky
Assistant Examiner—M. Macy
Attorney, Agent, or Firm—Seed & Berry

[57] ABSTRACT

A multi-part piston assembly for an internal-combustion engine having at least one cylinder. The assembly has a skirt with a threaded member connected thereto, the skirt being adapted to fit into the cylinder for reciprocal movement, and has a removable piston head that has an threaded bore therein adapt:ed to receive the skirt's threaded member removably attach the piston head to the skin. The removable piston head has rings mounted thereon and is adapted to fit into the cylinder for reciprocation with the skirt. A lock screw that locks the piston head to the skirt when the piston head and skirt are attached for use.

25 Claims, 2 Drawing Sheets

ASSEMBLY AND METHOD OF USING A MULTI-PART PISTON WITH A REMOVABLE HEAD

TECHNICAL FIELD

This invention relates to a piston, and most particularly, to a piston used in an internal-combustion engine.

BACKGROUND OF THE INVENTION

A typical internal-combustion engine utilizes a plurality of pistons to drive a crankshaft. Each of the pistons is positioned within a cylinder in the engine for reciprocal movement between a top and a bottom position within the cylinder as a result of volatile fuel being burned within the chamber defined by the cylinder. The fuel burning process generates high-pressure gases within the chamber, which drives the piston downward within its cylinder, thereby causing the crankshaft to turn. The momentum of the crankshaft and the turning forces applied thereto by other pistons will return the pistons to the top position within the cylinder. Typical engine pistons reciprocate within their cylinders thousands of times per minute, and each piston is subjected to very high pressures and temperatures. Accordingly, the pistons must be able to operate in these severe environments throughout the life of the engine.

A typical piston has a cylindrical piston head with annular piston rings installed in grooves extending circumferentially around the piston head. The piston head and rings are shaped to fit into the cylinder such that the rings engage the cylinder walls as the piston reciprocates. The piston rings maintain compression within the chamber during certain portions of the piston's travel within the cylinder to maximize the power generated. Although lubrication is provided, the rings still are subject to wear over time because of the constant sliding contact with the cylinder walls. As such, the piston rings will require replacement when sufficiently worn.

As the piston reciprocates within the cylinder, the top surface of the piston head is subject to the severe conditions created when fuel is sprayed into the chamber above the piston and ignited by a spark from a spark plug. The explosive reaction creates very high temperatures and pressures in the chamber and on the piston. As a result of these severe conditions, the piston head also wears over time and may require the repair or replacement of the piston.

When the rings and the piston head wear, compression within the cylinder decreases, thereby decreasing the horsepower generated from the engine. Also, fuel economy is lessened and smoke created by oil blown by the rings increase. In a racing vehicle such as a drag racing car, the loss of horsepower is crucial and can make the difference between winning and losing a race. As a result, extreme attention is paid to the condition of the pistons and rings.

The process of changing the piston or the rings is very labor-intensive because each worn or damaged piston must be removed from its cylinder. The piston has a piston skirt which includes two bosses with coaxial bores adapted to receive a piston pin which connects one end of a piston rod to the piston. The piston rod is connected at its opposite end to the crankshaft. The removal process typically requires gaining access to the bottom of the vehicle by lifting the car off the ground, draining the oil from the engine, removing the oil pan, and exposing the crankshaft and the bottom ends of the cylinders. Then, each desired piston rod must be disconnected from the crankshaft so the piston and piston rod can be pushed out the top end of the cylinder, which is made accessible by removing the engine's cylinder head assembly. After the piston has been removed, the worn rings may be changed or repaired. If the piston's head has been extensively worn or damaged, the piston must be separated from the piston rod, replaced and reconnected. Then, the piston with its rings and the piston rod assembled thereto must be reinserted into the cylinder and the piston rod reconnected to the crankshaft. Thereafter, the engine must be reassembled.

The process of removing, repairing or replacing one or more pistons and reassembling the engine must be performed manually and can take a considerable amount of time. The process can take a very experienced team of mechanics over four hours for a drag racing car. In certain conditions, such as in between drag races, time is a precious commodity and insufficient time may be available to complete a ring replacement job. In a conventional automobile, the average mechanic takes all day to remove and replace one or more pistons in an engine. This extremely lengthy process results in an extremely expensive repair for the customer.

SUMMARY OF THE INVENTION

The present invention provides a multi-part piston assembly for an internal combustion engine having at least one cylinder, wherein the piston assembly avoids the above-described problems experienced by conventional pistons. The piston assembly of the present invention has a base portion or skirt that is adapted to fit into a cylinder, a removable top portion or piston head that is adapted to fit into the cylinder and that has at least one piston ring mounted thereon. The piston head is removably attached to the skirt.

In a particular embodiment of the invention, the piston assembly utilizes a separate piston head having a coaxially aligned, internally threaded bore therein opening at the bottom surface of the piston head. A separate skin has a coaxially aligned, externally threaded member extending from a top surface of the skin to threadably engage the internally threaded bore of the piston head such that the piston head and skirt can be securely and removably connect together. A locking member extends through the piston head and engages the skirt, whereby the piston head and skin are securely locked together and prevented from separating while in use.

The piston assembly allows for a method of changing a piston head and associated piston rings which involves removing the engine's cylinder head assembly to provide access to the top of at least one of the cylinders and the piston assembly therein, removing the locking member, disengaging the piston head from the skirt, and withdrawing the piston head and the associated rings through the top of the cylinder. Then, the piston head and rings may either be reworked or completely replaced. The reworked or new piston head and rings are inserted into the top of the cylinder and connected to the skirt therein. The locking member is then replaced, thereby forming a complete and secure piston assembly. The cylinder head assembly may then be reattached to the engine.

BRIEF DESCRIPTION OF THE DRAWINGS

The present invention will be more clearly understood from the following detailed description of the preferred embodiment taken in conjunction with the attached drawings.

DETAILED DESCRIPTION OF THE INVENTION

Figure 1:
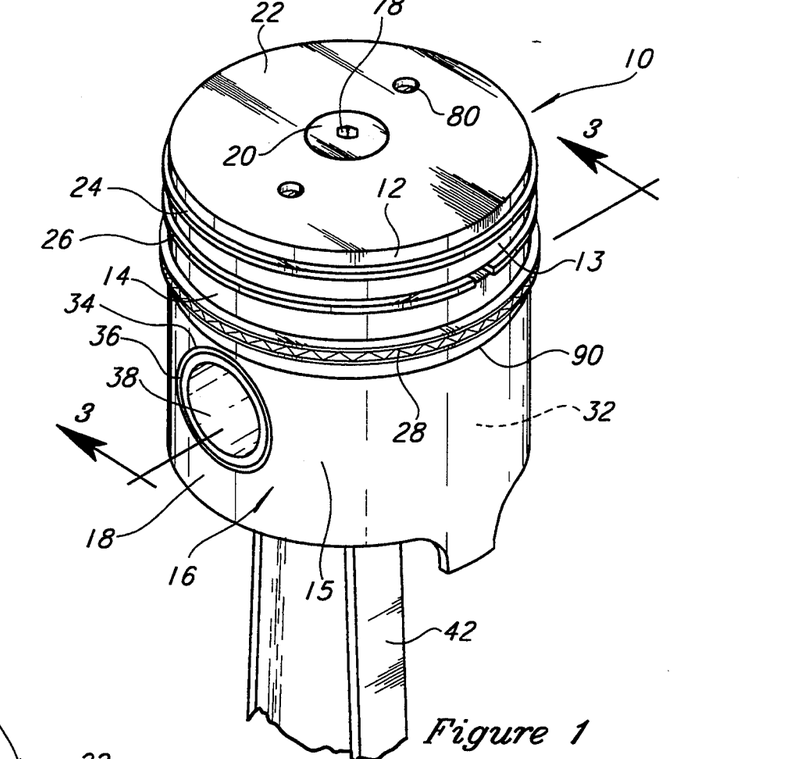
FIG. 1 is an isometric view of a piston assembly in accordance with the present invention.

As shown in the drawings for purposes of illustration, the present invention is embodied in a piston assembly 10. As best shown in FIG. 1, the piston assembly 10 has a cylindrical top or head portion 12 removably connected in coaxial alignment to a cylindrical base or skirt portion 16. The head portion 12 has circumferential side walls 14, and the skirt portion 16 has a circumferential sidewall 18, with both sidewalls 14 and 18 having substantially the same diameter. The head portion 12 and skirt portion 16 are sized to slidably fit when assembled together into a conventional cylinder (not shown) within an internal combustion engine (not shown). In the preferred embodiment, the head portion 12 has a predetermined vertical dimension, although head portions having different vertical dimensions can be assembled with the skirt portion 16. As discussed in greater detail below, the head portion 12 has a threaded central bore 19 which threadably receives a threaded member 21 of the skirt portion 16 to threadably attach the head portion to the skirt portion during usage, and allows removal of the head portion from the skirt portion so the head portion can be separated from the skirt portion and then removed through the top of the cylinder while the skirt portion remains within the cylinder. The head portion 12 and skirt portion 16 are selectively locked against rotation during usage by a lock screw 20.

The head portion 12 has a substantially flat top surface 22. The sidewall 14 of the head portion 12 has three circumferential grooves 23, 25 and 27 formed therein to receive a first compression ring 24, a second compression ring 26, and an oil sealing ring 28, respectively. When the piston assembly 10 is installed in a cylinder, the first compression ring 24, second compression ring 26, and the oil sealing ring 28, collectively referred to as the rings, project slightly outward beyond the sidewall 14 to slidably engage the cylinder's sidewall and provide a seal between the head portion 12 and the cylinder. Although the preferred embodiment utilizes three rings and three associated grooves, more or less rings and associated grooves may be used.

Figure 2:
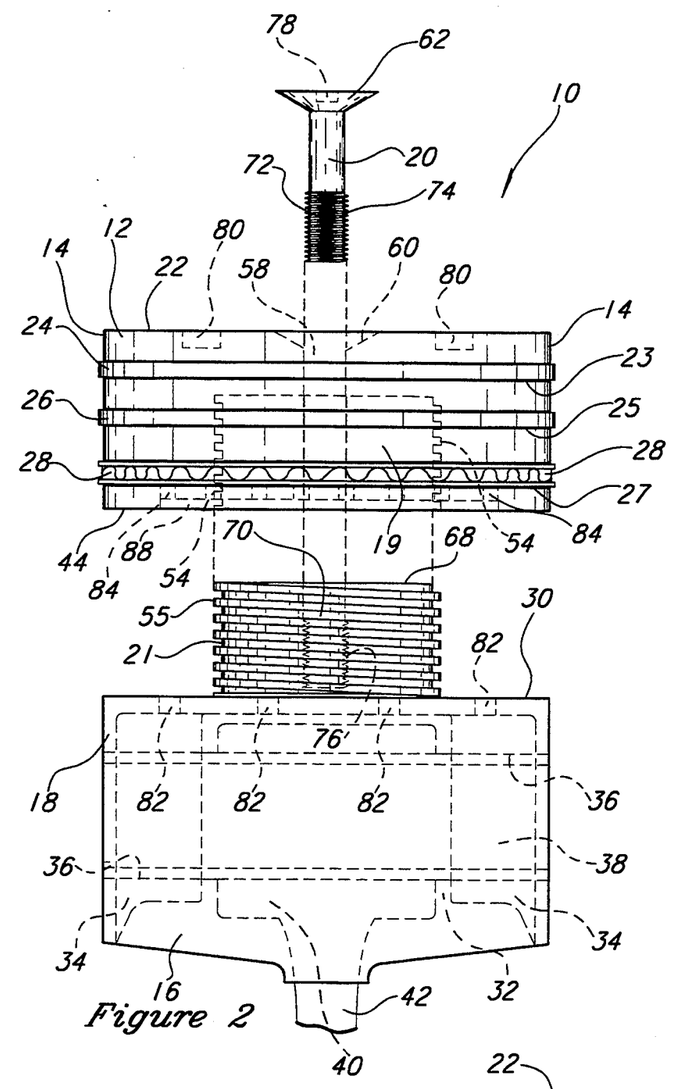
FIG. 2 is an exploded, enlarged side view of the piston assembly of FIG. 1.

The skirt portion 16 is a relatively thin walled, inverted cup-like structure that has a substantially flat, annular top wall panel 30 extending circumferentially about the threaded member 21, and an open bottom to provide access to a downwardly open interior portion 32 formed by the sidewall 18. A pair of interiorly projecting bosses 34 are formed integral with the sidewall 18 within the interior portion 32 with each boss positioned on an opposite side of the skirt portion 16. A transverse bore 36 extends through each boss 34 and the sidewall 18 and the bores 36 are coaxially aligned. The bore 36 is adapted to securely receive a wrist or piston pin 38 that extends between the bosses 34 and spans the interior portion 32. The bosses 34 are spaced apart sufficient to receive a top portion 40 of a piston rod 42 therebetween with the piston pin 38. In conventional manner, the piston rod 42 is connectable at its lower end to a crankshaft (not shown).

The piston head 12 has a substantially flat, circular top wall 22 and a substantially flat, annular bottom wall 44 extending circumferentially about the threaded bore 19. When the head portion 12 is threadably attached to the skirt portion 16 for usage, using the threaded member 21 and threaded bore 19, the annular bottom wall 44 of the head portion is in seated engagement with the annular top wall 30 of the skirt portion.

The threaded bore 19 of the head portion 12 is coaxial with the head portion sidewall 14 and extends from the annular bottom wall 44 upward toward and terminates short of the top wall 22. In the preferred embodiment, the threaded bore 19 extends upward approximately one-half of the height of the head portion 12 and has a diameter of approximately one-half of the diameter of the head portion, although construction with different dimensions may be used. The threaded bore 19 has internal threads 54 with a plurality of turns along its entire height. The threaded member 21 of the skirt portion 16 is coaxial with the skin portion sidewall 18 and extends upward from the annular top wall 30. The threaded member 21 has external threads 55 along its entire height with a plurality of turns sized to threadably mate with the interior threads 54 of the threaded bore 19. In the preferred embodiment, the internal threads 54 and the external threads 55 are square-edged threads to achieve a secure interface therebetween. With this arrangement, the head portion 12 with the threaded bore 19 therein may be screwed onto the threaded member 21 of the skirt portion 16 until the head portion annular wall 44 engages the skin portion annular top wall 30.

Figure 3:
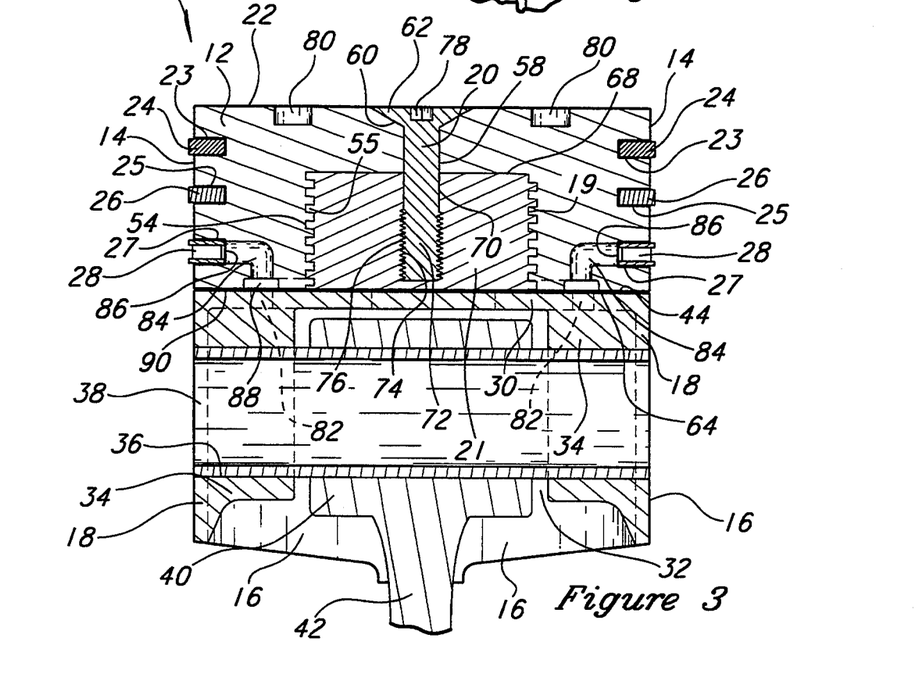
FIG. 3 is an enlarged cross-sectional view of the piston assembly taken along line 3—3 of FIG. 1.

A smooth wall bore 58 having a diameter smaller than the threaded bore 19, extends downward coaxially therewith from the top wall 22 and intersects the upper end of the threaded bore 19. The threaded member 21 of the skirt portion 16 has a coaxial threaded bore 70 smaller in diameter than the threaded member 21 and in coaxial alignment with the smooth wall bore 58 in the head portion 12. The bore 70 extends from a top wall 68 of the threaded member 21 downward and terminates at about the annular wall 30. The smooth wall bore 58 and the threaded bore 70 are adapted to receive the lock screw 20. The top wall 22 has a countersunk top portion 60 that is adapted to receive a head 62 on the lock screw 20 such that the screw's head is flush with the top wall 22. When the threaded member 21 of the skirt portion 16 fully engages the thread bore 19 of the head portion 12 to bring the annular bottom wall 44 of the head portion into tight engagement with the annular top wall 30 of the skirt portion, the lock screw 20 can be tightened in the threaded bore 70 so as to lock the head portion 12 and skin portion 16 together. Both the threaded member 21 and the threaded bore 70 have the opposite hand so that the lock screw 20 must be turned in one direction to loosen it from the skirt portion 16 and the head portion must be turned in the opposite direction to loosen it from the skirt portion. The lock screw 20 further includes a hexagonal aperture 78, or may have a slot in the top of its head 62 to receive a tool for rotating the lock screw.

In order to screw the head portion 12 off of or onto the skirt portion 16 when the skirt portion is within an engine cylinder, the head portion has a pair of tool receiving holes 80 formed into the top wall 22 and spaced apart diametrically opposite sides of the head portion's longitudinal axis. The holes 80 are machined into the piston head 12 and each is adapted to receive one finger of a hand-held spanner tool (not shown) so that a person can easily rotate the head portion in either the clockwise or counter-clockwise direction when the lock screw 20 is removed. Although the preferred embodiment utilizes two holes 80 in the head portion 12, any configuration that enables a tool to engage the head portion to rotate the piston head relative to the skirt portion 16 may be used. For removal, once the head portion 12 is disconnected from the skirt portion 16, a second tool (not shown) may be inserted into the smooth wall bore 58 or otherwise connected to the head portion to lift the head portion out of the engine cylinder.

When the piston assembly 10 is in use with the head portion 12 positioned in the engine cylinder, only the rings 24, 26, and 28 physically contact the cylinder wall. Accordingly, the skirt portion 16 is not subjected to much wear over time and can be made of titanium or other highly durable material to assure the skirt portion will not have to be removed for repair except in extreme cases. The head portion 12 is made of aluminum, but can be made of any material that can withstand the severe conditions in the cylinder without changing its removability characteristic.

Figure 4:
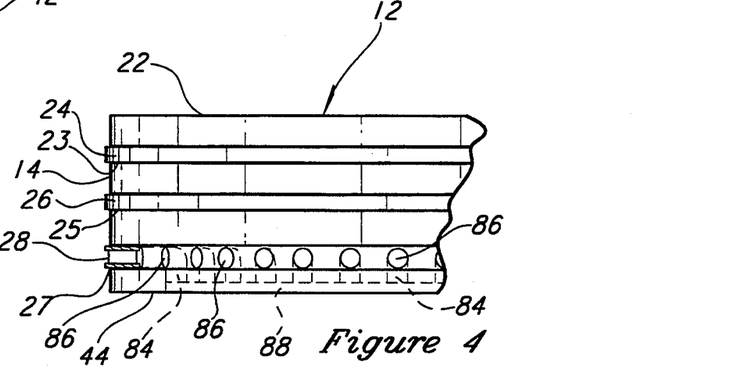
FIG. 4 is a fragmentary side view of the piston head of FIG. 1 with an oil sealing ring shown in cross-section.

To minimize wear on the rings 24, 26, and 28 and the cylinder wall, lubricating oil is channeled through the piston assembly 10 to the oil sealing ring 28 and onto the cylinder walls. When the engine is running, oil is liberally splashed or otherwise distributed into the interior portion 32 of the skirt portion 16 through its open bottom end. As best seen in FIGS. 3 and 4, the top wall 30 of the skirt portion 16 has eight circumferentially spaced apart oil holes 82 that extend from the interior portion 32 fully through the top wall 30. The oil holes 82 receive and distribute some of the oil splashed into the interior portion 32. The head 12 portion also has eight correspondingly spaced apart oil holes 84 that each extend from the annular bottom wall 44 upward and turn radially outward and terminate at an oil port 86 that communicates with the circumferential groove 27 in which the oil sealing ring 28 is disposed. The oil holes 84 in the head portion 12 are positioned so they will substantially align with the oil holes 82 of the skirt portion 16 when the head portion is securely connected to the skirt portion for use. To improve the distribution of oil to the oil holes 84, in case of misalignment of the oil holes 82 with the oil holes 8,1, art annular oil distribution channel 88 is formed in the annular bottom wall 44 of the head portion 12 in position which communicates with each of the oil holes 84 in the head portion 12. The oil distribution channel 88 is positioned to also communicate with the oil holes 82 of the skirt portion 16 when the head portion is securely connected to the skirt portion for use.

As a liberal amount of oil is distributed into the interior portion 32 by the movement of piston rod 42, the oil flows through the oil holes 82 in the skirt portion 16 and into the oil channel 88 in the head portion 12. The oil then flows along the oil channel 88 and through the oil holes 84 in the head portion 12 and out the oil ports 86 behind the oil sealing ring 28. The oil passes by the oil sealing ring 28 and out onto the wall of the cylinder, thereby providing sufficient lubrication between the piston assembly 10 and the cylinder. When the head portion 12 is securely connected to the skirt portion 16, the interface between the annular bottom wall 44 of the head portion and the annular top wall 30 of the skirt portion creates a sufficient seal such that a relatively small amount of oil seeps through at the interface.

The oil channel 88 may be eliminated if the oil holes 82 and 84 are formed into the skirt and head portions 12 and 16 in precise positions such that when the head portion is screwed onto the threaded member 21 of the skirt portion, the oil holes are coaxially aligned to provide a continuous oil pathway from the interior portion 32 of the skirt portion to the oil sealing ring 28.

When the piston assembly 10 is positioned within the cylinder of an internal combustion engine, the head portion 12 may be separated from the skirt portion 16 and removed from the cylinder by a simple and time efficient process. Referring to FIGS. 1 and 2, the process involves gaining access to the top of the engine cylinder, e.g., by removing a cylinder head assembly from the engine and exposing at least one of the piston assemblies 10 located therein which is in need of repair or replacement. The lock screw 20 is then disengaged from the head portion 12 and the skirt portion 16 and removed from the cylinder area. The head portion 12 is then rotated to unthread it from the skirt portion 16. In the preferred embodiment, a removal tool (not shown) is inserted into the tool receiving holes 80 in the top wall 22 of the head portion 12 and rotated approximately 10–12 revolutions, thereby rotating the head portion about its longitudinal axis and disengaging it from the threaded member 21 of the skirt portion 16. The head portion 12 and the rings 24, 26 and 28 carried by the head portion are then lifted out of the cylinder by an extraction tool or the like. Thereafter, the head portion 12 and the rings 24, 26 and 28 may be modified, repaired, or replaced and then reinserted into the cylinder as an assembly. A head portion having a different vertical dimension can be connected to the skirt portion 16, thereby effectively changing the compression ratio.

The head portion 12 is then screwed onto the threaded member 21 of the skirt portion 16, until the annular bottom wall 44 of the head portion firmly engages the annular top wall 30 of the skirt portion. Once the head portion 12 is firmly and securely connected to the skirt portion 16, the lock screw 20 is reinserted into the head and skirt portions and screwed into place. The lock screw 20 is installed such that the countersunk head 62 thereof is securely seated in the countersunk hole 60 in the top wall 22 of the head portion and head and skirt portions are locked together. Thereafter, the cylinder head assembly may be replaced on the engine. This method of replacing a piston head or the rings may be accomplished in a matter of minutes rather than a matter of hours.

Numerous modifications and variations of the multi-piece piston assembly with a piston head portion removable from above and method disclosed herein will occur to those skilled in the art in view of this disclosure. For example, the head and skirt portions may be removably connected together other than by a threaded arrangement. Further, other locking means may be used than a lock screw. Therefore, it is to be understood that these modifications and variations, and the equivalents thereof, may be practiced while remaining within the spirit and scope of the invention as defined in the following claims.

We claim:

1. A piston assembly for an internal-combustion engine having at least one cylinder, the engine having a piston rod that extends into the cylinder, the assembly comprising:
   a base portion connectable to the piston rod and positionable in the cylinder, said base portion being adapted for reciprocal movement within the cylinder;
   a cylindrical head portion removably connected to said base portion to allow disconnection of said head portion from said base portion and removal of said head portion from the top of the cylinder without requiring disconnection of said base portion from the piston rod, said head portion being positionable in the cylinder for reciprocal movement with said base portion when connected together, said head portion carrying at least one ring for sealing with the cylinder as said head portion reciprocates; and
   a removable locking device that locks said head and base portions together against rotation relative to each other.

2. The piston assembly of claim 1 wherein said removable locking device is a fastener that is accessible to unlock and lock said head portion and said base portion from the top of the cylinder.

3. The piston assembly of claim 1 wherein said cylindrical head portion is threadably engaged to said base portion to allow said head portion to be unthreaded and disconnected from said base portion when in the cylinder.

4. The piston assembly of claim 1 wherein said head portion has a threaded bore therein, and said base portion has a threaded member that removably engages said threaded bore to removably connect said head portion to said base portion.

5. The piston assembly of claim 4, wherein said head portion has a fastener bore coaxially aligned with said threaded bore, said fastener bore being sized to receive said fastener adapted to lock said head portion relative to said base portion against movement therebetween, and said base portion has a threaded bore coaxially aligned with said threaded member and sized to receive said fastener.

6. The piston assembly of claim 4 wherein said threaded member has at least one thread having a plurality of turns, said thread having a square edge, and said threaded bore has at least one bore thread having a plurality of mating turns, said bore thread having a square edge.

7. The piston assembly of claim 1 wherein said removable head portion has at least one tool receiving means to receive a tool used to remove said head portion from said base portion when said head portion is positioned in the cylinder.

8. The piston assembly of claim I wherein said base portion has at least one first lubricant port therein adapted to carry a lubricant, and said head portion has at least one lubricant port that communicates with said base lubricant port and communicates with said ring to carry lubricant to said ring.

9. The piston assembly of claim 8 wherein said head portion has a bottom wall that sealingly engages with an upper wall of said base portion, and an annular lubricant distribution channel formed in one of said bottom wall or upper wall that communicates with said base lubricant port and with said head lubricant port.

10. The piston assembly of claim 3 wherein said base portion is cylindrical and has a threaded member coaxially aligned with said base portion; and
    said head portion has a threaded bore coaxially aligned with said head member and adapted to removably receive said threaded member therein.

11. The piston assembly of claim 10 wherein said threaded member has at least one thread having a plurality of turns, said thread having a square edge, and said threaded bore has at least one bore thread having a plurality of mating turns, said bore thread having a square edge.

12. The piston assembly of claim 1 wherein said head portion has a top surface accessible from the top of the cylinder and said locking device is positioned at said head portion such that said locking device is accessible through the top of the cylinder and removable from said head and base portions when said head and base portions are positioned in the cylinder.

13. The piston assembly of claim 1 wherein said locking device is a threaded locking member, said head portion has an axial bore extending fully therethrough, said axial bore being sized to receive said threaded locking member; and said base portion has a threaded bore coaxially aligned with said axial bore of said head portion and sized to removably and threadably receive said threaded locking member when it is inserted through said axial bore of said head member.

14. A piston assembly for an internal-combustion engine having at least one cylinder assembly comprising:
    a base portion having a transverse bore, said base portion being sized to fit into the cylinder for reciprocal movement therein;
    a piston pin connected to said base portion and positioned in said bore;
    a piston rod connected to said piston pin and extending away from said base portion;
    a removable head portion sized to fit into the cylinder, said head portion being removably attached to said base portion at a location away from said piston rod from reciprocal movement with said base portion; and
    a locking member removably connected to said base portion and to said removable head portion, said locking member being removable from said removable head portion when said removable head and base portions are positioned in said cylinder, and said locking member being operable to permit removal of said removable head portion from said base portion when said removable head and base portions are positioned in the cylinder.

15. The piston assembly of claim 14 wherein said removable head portion has a threaded bore therein, and said base portion has a threaded member that removably engages said threaded bore to removably connect said removable head portion to said base portion.

16. The piston assembly of claim 15 wherein said locking member is connected to said removable head portion and said base portion to prevent rotation of said removable head portion relative to said base portion.

17. The piston assembly of claim 15 wherein said threaded member has at least one thread having a plurality of It, ms, said thread having a square edge, and said threaded bore has at least one bore thread having a plurality of turns, said bore thread having a square edge.

18. The piston assembly of claim 14 wherein said removable head portion has at least one tool receiving means to receive a tool used to remove said head portion when said head portion is positioned in the cylinder.

19. The piston assembly of claim 14 wherein said base portion has at least one lubricant port therein adapted to carry a lubricant, and said removable head portion has at least one ring mounted thereon and has at least one lubricant port that communicates with said base lubricant port and communicates with said ring to carry lubricant to said ring.

20. A piston assembly for an internal combustion engine having at least one cylinder, the assembly comprising:
 a base portion having a transverse bore, said base portion being sized to fit into the cylinder for reciprocal movement therein, said base portion having at least one lubricant port therein adapted to carry a lubricant;
 a piston pin connected to said based portion and positioned in said bore;
 a piston rod connected to said piston pin and extending away from said base portion; and
 a removable head portion sized to fit into the cylinder, said head portion being removably attached to said base portion at a location away from said piston rod for reciprocal movement with said base portion said removable head portion having at least one lubricant port that communicates with said base lubricant port and is adapted to carry lubricant to the cylinder.

21. The piston assembly of claim 20 wherein said removable head portion has a bottom wall that sealingly engages with an upper wall of said base portion, and an annular lubricant distribution channel formed in one of said bottom all or upper wall that communicates with said base lubricant port and with said head lubricant port.

22. A piston assembly for an internal-combustion engine having at least one cylinder and a piston rod for each cylinder, comprising:
 a piston skirt connectable to the piston rod, said skirt having:
  a first top face and a bottom opening;
  a threaded member fixedly connected to said first top face, said threaded member being coaxially aligned with said skirt;
  a first threaded bore in and coaxially aligned with said threaded member; and
  at least one first oil port extending through said first top face, said first oil port positioned radially outward from said threaded member;
 a removable upper portion having:
  at least one circumferential groove thereon adapted to receive a piston ring;
  a piston ring disposed in said circumferential groove;
  a second top face;
  a bottom face;
  a second threaded bore in said bottom face that is adapted to removably engage said threaded member, said second threaded bore being coaxially aligned with said upper portion;
  an axial bore extending through said removable upper portion from said top face to said threaded bore;
  a tool receiving area in said second top face adapted to temporarily receive a tool used for removing said removable upper portion from said skirt; and
  at least one second oil port in said bottom face for fluid communication with said ring groove, said second oil port being positioned radially outward from said second threaded bore for fluid communication with said first oil port of said skirt; and
 a threaded fastener shaped to fit through said axial bore in said removable upper portion, said threaded fastener being adapted to threadably engage said first threaded bore of said skirt.

23. A method of changing at least one piston ring in an internal-combustion engine having at least one cylinder with a piston disposed in the cylinder, the piston having a piston top portion carrying at least one ring which is removably connected to a piston base portion which remains in the cylinder and a removable locking device that locks the piston top portion to the piston bottom portion, comprising the steps of:
 exposing the top of the cylinder and the piston top portion located therein;
 unlocking and removing through the top of the cylinder the removable locking device from the piston top portion when the piston top portion and piston base portions are positioned in the cylinder to permit removal of the piston top portion from the piston base portion;
 disconnecting the piston top portion from the piston base portion when said piston top and base portions are in the cylinder;
 removing the piston top portion with the first ring carried thereby from the cylinder as a unit;
 removing the first ring from the piston top portion when the top portion is out of the cylinder and the piston base portion remains in the cylinder;
 installing a new ring on the piston top portion;
 inserting the piston top portion carrying the new ring into the cylinder as a unit;
 securely connecting the piston top portion to the piston base portion;
 installing the removable locking device in the piston top portion from the top of the cylinder; and
 locking with the removable locking device the piston top portion to the piston bottom portion.

24. A method of changing a piston top portion of a piston assembly in an internal-combustion engine having at least one cylinder with a piston disposed in the cylinder, the piston having the first piston top portion with a vertical dimension which is removably connected to a piston base portion which remains in the cylinder, and a cylinder head assembly covering the cylinder, the cylinder head assembly being accessible from the top of the engine, comprising the steps of:
 removing the cylinder head assembly to expose the top of the cylinder and the first piston top portion located therein;
 disengaging the first piston top portion from the piston base portion when the first piston top and base portions are in the cylinder;
 removing the first piston top portion from the cylinder;

inserting a second piston top portion into the cylinder;
securely engaging the second piston top portion to the piston base portion; and
replacing the cylinder head assembly on the engine.

25. The method of claim 24 wherein inserting a second piston top portion into the cylinder comprises inserting a second piston top portion having a vertical dimension different from the vertical dimension of the first piston top portion.

* * * * *

UNITED STATES PATENT AND TRADEMARK OFFICE
CERTIFICATE OF CORRECTION

PATENT NO. : 5,363,822

DATED : November 15, 1994

INVENTOR(S) : Matthew J. Tuohy

It is certified that error appears in the above-identified patent and that said Letters Patent is hereby corrected as shown below:

In line 8, please delete "skin" and substitute therefor --skirt--.

In column 2, line 44, please delete "skin" and substitute therefor --skirt--.

In column 2, line 46, please delete "skin" and substitute therefor --skirt--.

In column 2, line 51, please delete "skin" and substitute therefor --skirt--.

In column 3, line 60, please delete "fiat" and substitute therefor --flat--.

In column 4, line 9, please delete "fiat" and substitute therefor --flat--.

In column 4, line 28, please delete "skin" and substitute therefor --skirt--.

In column 4, line 62, please delete "skin" and substitute therefor --skirt--.

In column 5, line 56, please delete "8,1" and substitute therefor --84--.

In column 7, claim 8, line 60, please delete "I" and substitute therefor --1--.

UNITED STATES PATENT AND TRADEMARK OFFICE
CERTIFICATE OF CORRECTION

PATENT NO. : 5,363,822
DATED : November 15, 1994
INVENTOR(S) : Matthew J. Tuohy

It is certified that error appears in the above-indentified patent and that said Letters Patent is hereby corrected as shown below:

In column 8, claim 10, line 5, please delete "has-a" and substitute therefor -- has a --.

Signed and Sealed this

Seventh Day of March, 1995

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,363,822

DATED : November 15, 1994

INVENTOR(S) : Matthew J. Tuohy

It is certified that error appears in the above-identified patent and that said Letters Patent is hereby corrected as shown below:

In column 8, claim 17, line 68, please delete "It, ms" and substitute therefor --turns--.

In column 9, claim 21, line 40, please delete "all" and substitute therefor --wall--.

Signed and Sealed this

Ninth Day of May, 1995

Attest:

BRUCE LEHMAN

Attesting Officer

Commissioner of Patents and Trademarks